United States Patent
Peters et al.

(10) Patent No.: US 6,292,795 B1
(45) Date of Patent: Sep. 18, 2001

(54) INDEXED FILE SYSTEM AND A METHOD AND A MECHANISM FOR ACCESSING DATA RECORDS FROM SUCH A SYSTEM

(75) Inventors: Matthew Peters; Stephen James Paul Todd, both of Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/250,760

(22) Filed: Feb. 16, 1999

(30) Foreign Application Priority Data

May 30, 1998 (GB) .................................................. 9811574

(51) Int. Cl.$^7$ ...................................................... G06F 12/02
(52) U.S. Cl. ........................ 707/3; 707/1; 707/2; 707/4; 707/5; 707/6
(58) Field of Search .............................................. 707/1–6

(56) References Cited

U.S. PATENT DOCUMENTS

| | | | |
|---|---|---|---|
| 4,611,272 | * | 9/1986 | Lomet ........................................ 707/3 |
| 5,557,794 | * | 9/1996 | Matsunaga et al. ...................... 707/3 |
| 5,727,197 | * | 3/1998 | Burgess et al. .......................... 707/2 |
| 5,887,274 | * | 3/1999 | Barry et al. ........................... 707/202 |
| 6,065,010 | * | 5/2000 | Otsuka et al. ......................... 707/101 |

* cited by examiner

*Primary Examiner*—John Breene
*Assistant Examiner*—Debbie M Le
(74) *Attorney, Agent, or Firm*—McGuireWoods, LLP; Stephen C. Kaufman (57) ABSTRACT

A computer filing system includes a data access and allocation mechanism including a directory and a plurality of indexed data files or hash tables. The directory is preferably a radix tree including directory entries which contain pointers to respective ones of the hash tables. Using a plurality of hash tables avoids the whole database ever having to be re-hashed all at once. If a hash table exceeds a preset maximum size as data is added, it is replaced by two hash tables and the directory is updated to include two separate directory entries each containing a pointer to one of the new hash tables. The directory is locally extensible such that new levels are added to the directory only where necessary to distinguish between the hash tables. Local extensibility prevents unnecessary expansion of the size of the directory while also allowing the size of the hash tables to be controlled. This allows optimisation of the data access mechanism such that an optimal combination of directory-look-up and hashing processes is used. Additionally, if the number of keys mapped to an indexed data file is less than a threshold number (corresponding to the number of entries which can be held in a reasonable index), the index for the data file is built with a one-to-one relationship between keys and index entries such that each index entry identifies a data block holding data for only one key. This avoids the overhead of the collision detection of hashing when it ceases to be useful.

12 Claims, 6 Drawing Sheets

INDEXED FILE SYSTEM AND A METHOD AND A MECHANISM FOR ACCESSING DATA RECORDS FROM SUCH A SYSTEM

FIELD OF INVENTION

The present invention relates to accessing data records from a database, and in particular to accessing data from a dynamic database to which data elements can be added and from which data elements can be deleted such that the data volume (and not just data values) can change over time.

BACKGROUND OF THE INVENTION

With any database, it is necessary to have a file structure and access method which enables efficient access to data records. Hashing techniques which access records by transforming keys to addresses are well known in the art. A hash table comprises an indexed data file which is held in storage with the index being used to associate data keys with addresses of particular data storage blocks or "bins" within the file. An input hash key is transformed by a hashing algorithm (which may be a simple numerical division or a more complex transformation) and is then compared with the index of the hash table held in system memory to obtain the address of the relevant bin within a data file which is held in a peripheral storage device. A determination is then made of which data elements in this data file bin are the relevant ones for the key. This determination is known as "disambiguation" or "collision handling", and may be as simple as comparing the hashed key with the stored keys of elements in the file.

There are problems with pure hashing techniques in relation to large databases. If bins are too large (i.e. there are too many data elements in each separate data file bin) then the collision handling part of the data access process is too slow. If bins are too small then the hash table itself is too large and takes up too much disk space. For a very large database, conventional hashing tables will take up too much disk space for any reasonable bin size and may be too large to transfer their index into memory. However, hashing is still a very effective access technique for smaller databases.

Hashing was originally used with static data structures ('static' in the sense that the extent and structure of the data remain unchanged during processing and only data values are updated). The first adaptations of such static structures to allow for insertions and deletions required deletion-flags and pointers to 'overflow bins' which were separate from the main data structure. Frequent expensive restructuring of the data structure was required (typically when the number of holes left by deletions, and overflow areas created by insertions, became sufficient to degrade performance significantly). Adaptations of hashing techniques for use with dynamic databases required costly 'rehashing' whenever a bin within the hash table became over-full (i.e. when the keys pointing to an individual disk file have too many data items associated with them). Rehashing involves the choice of a new fixed size for the hash table and bins within the table, a new hash function, and relocation of all records within the table. Opting for a hash table size and bin size that uses a high estimate of the number of records to be placed therein would minimize rehashing frequency but would also result in valuable disk space being wasted. Underestimating hash file storage requirements results in a large number of overflow records (slowing down searching and updating) and frequent rehashing. More efficient and adaptable file organisations and access techniques are required for dynamic databases.

An access method dubbed "extendible hashing" was described by R. Fagin et al in "Extendible Hashing—A Fast Access Method for Dynamic Files", ACM Transactions on Database Systems, Vol.4, No.3, September 1979, pages 315–344. This paper describes a particular adaptation of hashing which makes hash tables extendible by separating the hash address space from a directory address space. The hash table, which includes a directory with each entry pointing to a disk file or bin within the table, is extendible since additional bins are added if a bin overflows and the directory is extended to use an additional bit of information from each input hash key to distinguish between the increased number of bins. The most significant bits of the hash address are used as the index to the address space and the number of significant bits used is increased if any bin overflows. This extension is done without rehashing the whole hash table. The capacity of each bin is kept constant such that the hashing algorithm is unchanged. There is a problem with this solution since the directory doubles in size each time a bin overflows, and so the hashing table which exists to enable efficient access to data elements may itself take up too much of the available disk space. This is a particular problem for very large databases to which data records are added randomly and for which the hash table is too large to be held in memory. Furthermore, certain operating systems impose a restriction on the maximum size of a hash table such that they are not extensible beyond that maximum.

The Fagin et al paper also describes the same solution from a different perspective, referred to as a "balancing" of radix search trees. Radix search trees examine an input key one digit or letter at a time, and the search focuses on a particular branch of the tree at each step through the tree hierarchy. Radix trees can provide faster access than search trees which compare whole keys, but they typically use more memory space. Fagin et al propose a 'flattened' directory structure which seeks to maximize access speed by flattening the directory structure such that a single pointer from the directory accesses a required file. The depth of the directory (how many levels are flattened into one, and so how many significant bits of a key are used in a search) can be varied as necessary to guarantee access to a required file in a single probe. Each time a "leaf" (a page of memory at the bottom of the directory hierarchy) overflows, requiring a new directory level, the directory is doubled in size to extend it while keeping a flattened structure. The radix tree has thus degenerated into a one-step access mechanism for maximum speed, but at considerable cost in memory unless the keys are very uniformly spread over the key space.

P. A. Larson's paper "Dynamic Hashing", BIT vol.18, No.2 (1978), pages 184–201, describes a further file organisation based on hashing in which the allocated storage space can be increased and decreased without rehashing the whole file. This is achieved by providing an index to a data file which index is organised as a series of binary hash trees, nodes of the index including pointers to particular buckets within the data file. The problem which arises with this file organisation is that the data file can become difficult to manage as a contiguous file as data is added and the file grows, and so this solution is not well suited to large databases.

SUMMARY OF INVENTION

In a first aspect, the present invention provides a data access mechanism for a computer filing system, the access mechanism including:

a directory having a plurality of directory entries at least some of which provide pointers to respective indexed data files;

logic for analysing a data key input to said filing system, by comparison of the data key with entries in the directory, to identify one of said plurality of directory entries providing a pointer to a respective indexed data file;

a plurality of indexed data files for storing data; and a plurality of indices, each corresponding to one of said indexed data files;

wherein each of said indexed data files is locatable via one of said pointers, wherein the index for each indexed data file contains identifiers and storage addresses of data blocks within the indexed data file, each indexed data file having associated logic for transforming an input data key to generate a transformed key and logic for comparing a transformed key with data block identifiers in the index to identify a match and to obtain the address of an identified data block within the indexed data file, and each indexed data file having associated logic for identifying from records within an identified data block one or more data records related to the input data key.

The directory is preferably an hierarchical directory such as a radix tree directory, for iteratively analysing the input data key to identify the respective pointer, one iteration being performed by a comparator at each successive node of the hierarchy to select a path through the directory from that node towards a "leaf node" comprising the lowest level of the hierarchy for the respective branch of the hierarchy, each leaf node providing a pointer to a respective hash table, and each iteration of the analysis using one or more additional bits of information from the input key (i.e. additional to the information used by the previous node) to distinguish between keys until a leaf node is reached. As noted previously, a hash table is an indexed data file having an associated algorithm for transforming an input data key to a data string that can be compared with the index to identify a data block within the data file, and having a process for identifying data records relevant to the input key from the records within the data block.

The directory according to the invention is preferably locally extensible such that the number of bits of an input key used to identify a hash table can be varied over time and according to the amount of data associated with different areas of the key space. Since leaf nodes of the directory can point to different hash tables, the number of hash tables allocated can also be varied such that each hash table remains at a manageable size.

The combination of an extensible directory and a variable number of hash tables permits efficient access to data records within a very large database as well as efficient access when the database is small. A pure directory-look-up approach for a very large database would require a directory which takes up too much storage space and, since the directory would be unlikely to fit within memory, the number of disk accesses required to step through the directory may result in poor access performance. A pure directory approach for a small database would be wasteful of memory space. The alternative of a pure hashing approach is likely to be slow for very large databases since the need to control the size of the hash table as it is represented within memory will result in very large data bins within the table as stored in secondary storage such that collision handling will be slow. By using a number of separate hash tables, it is possible to avoid ever having to rehash the entire database all at once and the size of each hash table can be managed effectively. There is no requirement for the separate hash tables to be stored together in a contiguous block of storage.

The invention according to a preferred embodiment thus uses a locally extensible directory (which may be a radix tree directory) providing pointers to a variable number of indexed data files to access data within a dynamic file system. The invention according to this embodiment enables the proportion of the access processing which is performed by the directory and the proportion performed by hashing to be varied as the database grows (or shrinks) such that the access method remains optimal for the current database characteristics. If certain input data keys have a lot of data associated with them, then the data file for that area of the key space will be implemented as a hash table which only contains data for a relatively small number of different keys and there will be relatively little collision (i.e. a large proportion of the data in a bin will be associated with a small number of keys or the same key). If a data file has a sufficiently small number of keys associated with its data then the data file index may point to a data file bin that contains data for only this key and then the collision detection step of hashing will be superfluous for data within that bin.

The present invention according to a preferred embodiment takes advantage of this characteristic. When a data file is to be split and the number of keys to be mapped to each replacement disk file will be no greater than the number of bins within each file, the data allocation mechanism of the present invention organizes the replacement disk files such that each key is mapped to a separate bin, and then no collision detection is needed for these disk files. The cost of the collision detection step of hashing has thus been avoided for any disk files for which the relevant key space can be represented by an index which maps one key to one data bin.

This avoidance of collision detection for areas of the key space having lots of associated data provides for high performance when the database is large, and local extensibility of the directory maintains optimal performance when usage of the key space is uneven (that is, high performance is possible if the disk space and memory space of a large system are also available). If the system is small then the economy of resources of hashing is desirable and the cost of collision detection is acceptable because there is not much data.

A data access mechanism and a filing system according to a preferred embodiment of the invention has a predefined maximum hash table capacity, the hash tables each being extensible up to said predefined maximum. For example, when a data "bin" (a block of storage) within a hash table becomes full, that bin may be moved to a new storage location corresponding to a larger storage area such that the total capacity of the hash table is increased. This is preferred to the alternative of replacing a bin with two separate storage blocks since keeping each bin as a contiguous storage block enables data access via a single disk access.

In response to a first hash table exceeding the maximum capacity, the data access mechanism is adapted to replace the first hash table with a plurality of separate hash tables and to extend the directory by addition of new nodes located on branches of the tree extending from the node of the directory which previously identified the pointer to the first hash table. The additional nodes form a new lowest level of the directory hierarchy for the respective branch—the previous "leaf node" becomes a branching node of the directory for selecting between the new "leaf nodes". The extended directory then uses one or more additional bits of information from input data keys (i.e. the next significant bits of the sequence of bits forming the key) to distinguish between the keys to identify a leaf node containing a pointer to a respective one of said two or more hash tables.

This avoids the problem of the Fagin et al prior art of repeated doubling of a directory each time a data file overflows, since the leaf nodes are not required to all be at the same level in the hierarchy and only the required parts of the directory are extended. Since the directory of the present invention identifies a pointer to one of a number of hash tables, rather than to specific data blocks within a hash table, the directory only needs to be extended when a hash table exceeds its maximum capacity and is split rather than being extended whenever splitting of a data block within a hash table increases the depth of the hash table as in Fagin et al. Similarly, the directory is more easily shrinkable when deletion of data from the database leaves under-used data bins than would a directory according to Fagin et al. Hash tables as implemented within the preferred embodiment of the invention are extensible by expansion of data blocks (allocating a larger area of storage for the bin and transferring the data to the new storage area), but this only requires updating of the header block within the respective hash table and not updating of the directory (unless the hash table has reached its maximum capacity).

In a second aspect, the invention provides a filing system for a computer including:

a plurality of indexed hash tables for storing data, each table being identifiable by a respective one of a plurality of pointers; and a directory for analysing input data to identify a respective one of the plurality of pointers, thereby to select one of the plurality of hash tables for storing the input data.

According to a preferred embodiment, the invention provides an indexed file system including a data processing system having a processor, memory, peripheral storage, and communication buses for transferring data between said processor, memory and peripheral storage, said indexed file system also including a data allocation and access mechanism comprising:

a directory, stored in said memory, including a plurality of directory entries at least some of which provide pointers to respective indexed data files;

logic, stored in said memory, for use by said processor to analyse a data key input to said filing system, by comparison of the data key with entries in the directory, to identify one of said plurality of directory entries providing a pointer to a respective indexed data file;

a plurality of indexed data files for storing data in said peripheral storage; and a plurality of indices, each corresponding to one of said indexed data files;

wherein each of said indexed data files is locatable via one of said pointers, wherein the index for each indexed data file contains identifiers and storage addresses of data blocks within the indexed data file, each indexed data file having associated logic for use by said processor to transform an input data key to generate a transformed key and logic for use by said processor to compare a transformed key with data block identifiers in the index to identify a match and to obtain the address of an identified data block within the indexed data file, and each indexed data file having associated logic for use by said processor to identify from records within an identified data block one or more data records related to the input data key.

The data access mechanism according to the invention is suitable for implementation in an indexed file system storing biometric data, where a plurality of input keys represent biometric data for an individual, such as a scanned fingerprint. A plurality of input keys (possibly hundreds or even thousands of data elements making up the biometric data for the individual) may be analysed within a parallel processing system which includes the data access mechanism of the invention, including comparing each key with a large database of biometric records (for example, a database holding thousands of data elements for each of several million individuals) to identify matches between each of the keys and stored records. An individual person can be identified or verified if the result of this keyed access to the large database is a significant number of matches between the input biometric data keys and stored biometric data records for that individual.

The characteristics of such an indexed file system for identification and/or verification of individuals using biometric data are that the size of the database may change by many orders of magnitude over time, and the key space is typically very unevenly used (i.e. there are long stretches of keys with no data while some keys have lots of data). The present invention is well suited to databases having these characteristics.

The method of the preferred embodiment is highly scalable and can support growth of the database by many orders of magnitude—in fact by a factor of 2 raised to the power of the number of bits in the key. At its smallest the database can be one hash table, with all of the data for all of the keys within it. At its largest, the database can include a separate disk file for every key, but will typically include a separate hash table for one or very few keys in areas of the key space which include a lot of data as well as hash tables representing larger numbers of keys in areas of the key space which have little data.

A method of data access according to the preferred embodiment of the invention is highly suitable for implementation in a parallel processing system, since once the data has been allocated to one node in a parallel system it can stay there. A radix tree directory can be analysed to provide a clear decision as to which node in a parallel system the data for a given key belongs, by means of pointers at the leaf nodes which identify both a particular system node and a particular disk file stored on that node.

The method of the preferred embodiment provides fast access to keyed data for standard operations such as insert, delete and retrieve. Data for any given key can usually be retrieved with a single disk operation, and so the time taken to retrieve the data remains almost constant over a very wide range of sizes of the database.

BRIEF DESCRIPTION OF DRAWINGS

An implementation of the invention will now be described in more detail, by way of example, with reference to the accompanying drawings in which.

DETAILED DESCRIPTION OF PREFERRED EMBODIMENT

Figure 1:
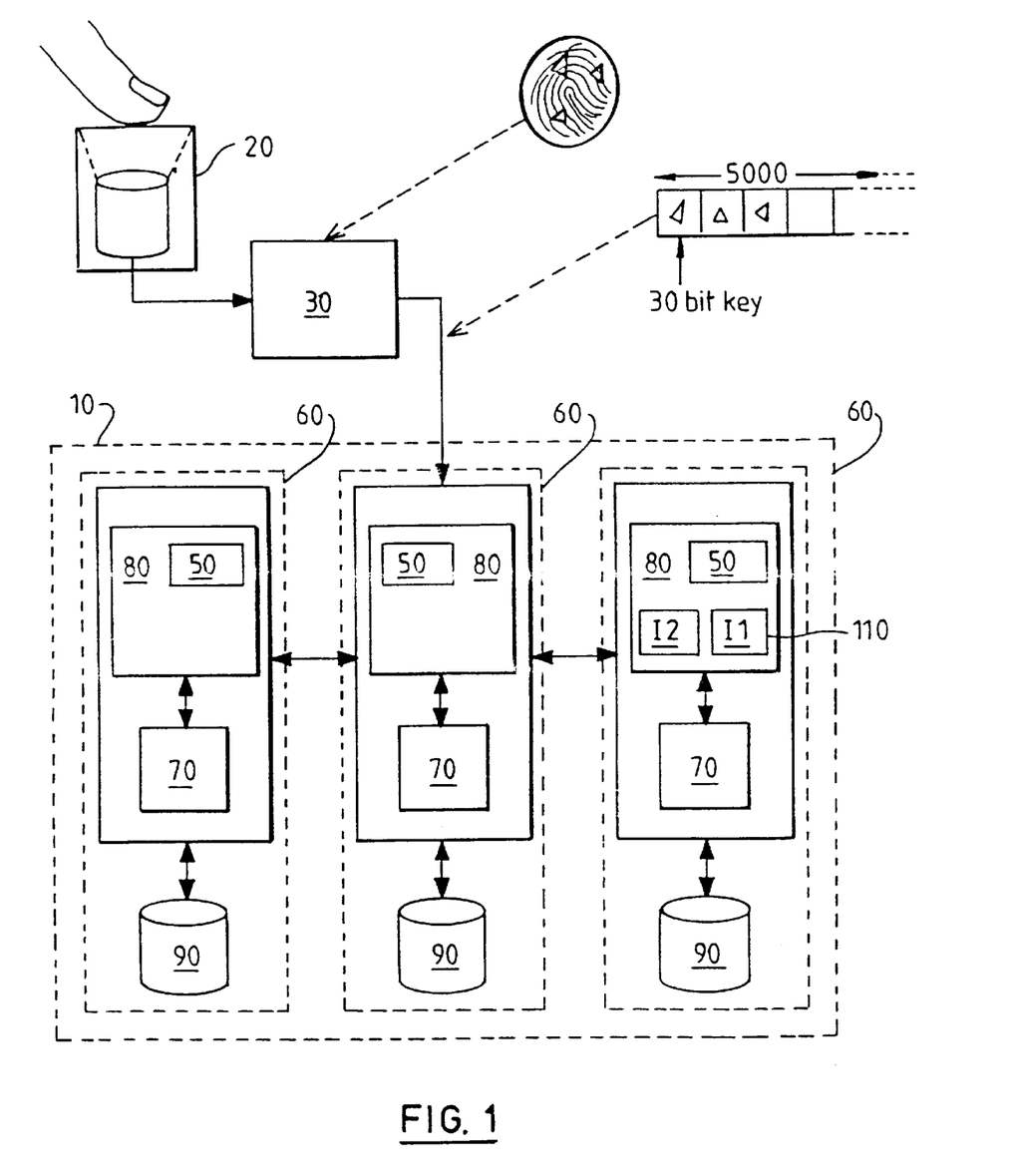
FIG. 1 is a schematic representation of a biometric data capture and indexed file system in which the invention is implemented.

FIG. 1 shows a file system 10 according to the invention receiving data from a fingerprint scanner 20. The scanner 20 captures an image of a fingerprint and passes this to a connected computer 30 which analyses the image to identify "minutiae" (fingerprint feature points comprising singularities in ridge patterns such as bifurcations or "forks", and ridge endings). These fingerprint feature points are then grouped into local subsets and data is generated which characterises the fingerprint image in the area of the group of feature points. As an example, five thousand feature point subsets may be identified and used to generate the characteristic data describing a single fingerprint. Each of these feature point subsets can be represented by an N bit number (for example, a 30 bit number).

Generation of characteristic data from a fingerprint image is described in detail in a co-pending U.S. patent application Ser. No. 08/764,949, which is assigned to the assignee of the present application and is incorporated herein by reference. However, the specific content of the data and the detail of its generation are not essential to the present invention and the detailed description of fingerprint image storage and matching is included herein only as an example application of the invention.

Each N bit number representing a feature point subset is then stored in the file system 10 together with a 4 byte identifier number of the person from which the fingerprint image was taken. This identifier number is then used to access additional personal information for each person registered with the system. This additional personal information is stored in a separate database and accessed via an identifier to avoid having to replicate the full personal information for each stored N bit number. Typically, information stored in the additional database relating to an individual person will include personal data including name, address, and national insurance number, social security number or identity card information, but the information may include any other data for which it is useful to be able to identify a person, or verify their identity, such as health records, bank details, criminal records, etc.

The file system 10 may be directly connected to or located remotely from the scanner 20 and analysing computer 30 in a computer network. The file system 10 according to a preferred embodiment is a parallel processing system having controller logic 50 implemented in software installed on each of a number of nodes 60 of the system. Each system "node" 60 is a processing unit comprising a processor 70 and random access memory 80 and is connected for communication with a respective secondary storage component 90 which may be a peripheral storage device. A database of fingerprint characterising data is distributed across the storage components 90 of the nodes 60, with each node providing access to its own storage component's database segment only.

The mechanisms implementing allocation of and access to data within the file system 10 will now be described in detail. The stored data is arranged in hash tables 100 to permit efficient data access. Hash tables are known to be well suited to databases to which data items are added in an unpredictable manner. Each N bit number provides an input key which is mapped by a hashing algorithm (under the control of the controller software 50 running on the processor 70) to an integer hash value which is then used to determine where the information is stored in the hash table. The bit pattern of each N bit number is thus used to provide a key ($k_i$) which is transformed to a value ($X_i$) within the scale of a hash table index 110 (i.e. a value which will match an entry in the index) and this transformed key ($X_i$) is then compared with the index 110 to determine a storage location 120 within the secondary storage 90 of the file system 10 for the information associated with that N bit number.

N bit numbers beginning with the same initial sequence of bits are not necessarily located within the same node of the parallel file system, since that would constrain the distribution of data across the nodes and may prevent optimal data sharing, but each hash table 100 is located in the secondary storage (for example, disk storage) 90 of a single system node 60 to enable efficient data access. If sufficient memory space is available, then the indexes 110 of the hash tables stored on a particular node are held in that node's memory 80. If the memory space is not sufficient, the hash table indexes are paged out to the peripheral disk storage 90 and only transferred into memory 80 when required for data allocation or data finding. Within a particular node, if the N bit numbers have sufficient bits in common then they will be stored in the same disk file.

The logical partitioning of the data within files according to the N bit number which represents part of that data provides a simple indexing scheme and an efficient access mechanism.

In addition to hash tables, the mechanism for allocating data within the file system and for providing access to the data also employs a dynamically extendible radix tree directory 130 for identifying particular ones of the hash tables. The radix tree directory 130 is referenced when processing an input key ($k_i$) to perform an iterative analysis (using a comparator to make a determination for each "node" or level of the directory) of blocks of bits of an input data key to distinguish between keys and identify a relevant one of a plurality of hash tables. Directory "nodes" are thus conceptual decision points at which a branch is selected. "Leaf nodes" comprising the lowest level nodes of respective branches of the radix tree directory provide pointers (P) to respective hash tables 100,110 on identified nodes. Leaf nodes also include a flag which identifies them as leaf nodes and which is used to trigger retrieval of the pointer and node identifier (preventing invalid attempts to step through non-existent further levels of the directory).

The radix tree directory and hash table indexes together form a "map" representing the complete organisation of data for the file system. In the case of a parallel system, a first controller node of the system is responsible for distributing data across the system nodes 60 and determining which node is responsible for storing data relevant to a particular key, and so the radix tree directory is held in the memory of this first node. The pointers within the leaf nodes of the directory identify a respective node and disk file for each input key. The other nodes 60 of the system only hold in memory the indexes for files located in the disk storage of those nodes (and these indexes may be paged out to disk if memory space is limited, as noted earlier). Thus, in a parallel system, the full data organisation map for the file system is not required to be held in one place but is distributed across the system nodes.

The map is processed by the processor 70 running computer program code (referred to hereafter as the controller software 50, and distributed across the memory 80 of the nodes 60 of the file system) to achieve allocation of input data and access to data in response to a search key, as will now be described.

Taking a simple example, let us assume that the database initially comprises a small number of data files on a single system node, say four files called:

dbfile.00
dbfile.01
dbfile.10 and
dbfile.11

Each of these files is held in disk storage and contains an index 110 identifying a number of data bins 120 which are variable size contiguous storage blocks within the file. (N.B. a more typical example than this simple example of 4 data files would have 400 separate data files). In a preferred implementation, each data file contains 16,001 bins which each have a small amount of storage space initially allocated to them. All the bins are initially the same size, but if there is already data allocated to bins in the file or we have some information about the distribution of bin sizes then an effort is made to allocate storage for a bin that is appropriate for the expected final size of the bin. The allocated storage space can be increased as data is added, and the final size of each bin is only constrained by the maximum size of the disk files. This is set as 500 MB in the preferred embodiment of the invention, although it could be a higher limit closer to the operating system imposed maximum of, for example, 2 gigaBytes.

The first file, dbfile.00, contains all the data for all keys that begin with binary '00', and the other filenames are similarly representative of the data which is allocated to them.

An example directory which is required to select between these four files when storing or accessing data initially has the simple structure of a "root" node (at the top level of the hierarchy) and four "leaf" nodes (at the second and lowest level of the hierarchy), the leaf nodes each containing a pointer to a corresponding one of the files. When the system is initialised, it builds a map representing this data organisation for the current hash table and directory structure.

If the file system 10 is implemented in a parallel processing system with the files distributed over the nodes of the system, the generated map also identifies which node the file is on. In particular, the bit pattern of the N bit numbers is used to identify a leaf node of the radix tree directory which contains data indicating which file they should each be allocated to and which node that file is held on.

Figure 3:
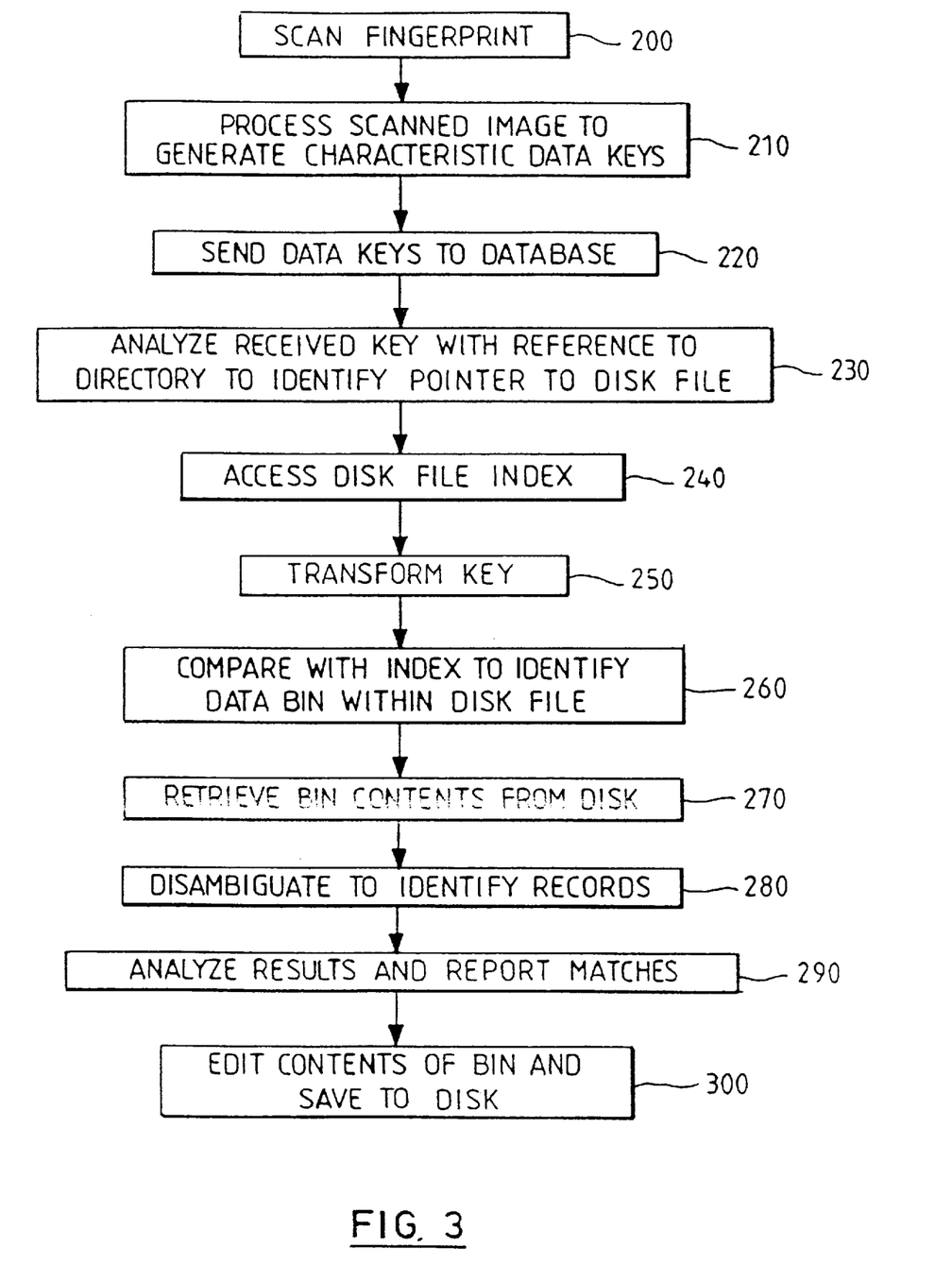
FIG. 3 is a schematic flow diagram showing the steps of a method of allocating and accessing data records according to an embodiment of the invention.

For simplicity, we will describe the allocation of data in the simple example database mentioned above which initially comprises four data files on a single node system with reference to FIG. 3. As data is inserted into the database, such as when a person is registered with the system and his/her fingerprint is first scanned 200, the first two bits of each of the generated N bit numbers (step 210) representing a feature point subset for that person's fingerprint are analysed (230) by comparator logic (a component of the controller software 50 held in the first controller node 60) run by the processor with reference to the directory to select a path from the root node to identify one of the leaf nodes. The selected leaf node provides a pointer to a hash table corresponding to one of the four data files (and a node identifier in the case of a parallel system).

Having identified a data file for storing each N bit number by retrieving 230 the pointer from the directory, the index and associated logic for that hash table is accessed 240 in memory (or retrieved into memory if currently stored on disk). The N bit number is then transformed 250 into a hash value by a hash function comprising part of the associated logic of the data file. This hash value is then compared 260 with the index of the hash table to identify a particular data bin (including obtaining its location, capacity and the number of records currently stored within it) within the data file in which to store the N bit number.

If the first two bits of an N bit number are '00', then the comparison step performed at the root node of the directory identifies the directory branch to the leaf node containing a pointer to the hash table for dbfile.00. The N bit number is then transformed by a hashing algorithm and the result is compared 260 with the hash table index for dbfile.00 to identify a bin within that file. The N bit number and its associated data are then sent to and stored 300 in that bin within disk storage. There is no need to specify a particular different storage location within the bin for each data record, since an entered data record is stored in the first available storage location in the bin.

In the preferred embodiment of the invention, each data entry operation is combined with a table look-up operation (270,280,290) which determines whether data is already held in the file system for that individual. The data entry policy could be to only store data if the database does not already include data for that individual, or to always accept data entry but to flag 290 matches with existing stored data for subsequent action by a system administrator or user of the system. Policies such as what reliance is to be placed on the automated record matching of the invention and whether to have a further step of an expert human fingerprint analyser checking apparent matches are implementation options for system users, and do not limit the scope of the invention.

Of course, in alternative embodiments of the invention, the above described four-way branching of the radix tree directory following a determination by a comparator at a first node which looks at blocks of two bits could be replaced with a different tree structure. For example, a binary differentiation at each level of the directory can be performed if a single bit is analysed, but the process of stepping through the levels of a binary tree tends to be slower than for a tree which splits more than two ways at each level. The directory could equally branch at each node into eight or sixteen or any number of $2^n$ (where 'n' is an integer) if blocks of 'n' bits are analysed. The choice of 'n' must balance the benefit of reducing the number of separate comparison steps by making 'n' large against the cost of unused allocated storage space for large 'n'.

Comparison of 4 bits at each level of the tree hierarchy and a consequent 16-way branching split at each level has been found to provide optimal use of processing hardware in a typical application of the invention. As the database increases in size, and feature point subset descriptors (N bit numbers) having the same initial bits and hence being transformed into the same hash value are added to the same bin, all of the storage space available in certain bins will eventually be filled. At this point it becomes necessary to extend the storage file by replacing a full bin with a larger bin, and changing the hash index to reflect this change. This is implemented by a process within the controller software 50, as will now be described with reference to FIG. 4. When an attempt 310 to insert data into a bin identified by the hash table index generates a response indicating that the bin is full (320,330), the controller software 50 allocates 350 a new area of storage to this hash table which is twice the size of the storage space currently occupied by the bin, thereby extending the total size of the hash table. The controller software updates 350 the hash table index to point to the address of the newly allocated storage space and the data from the full bin is transferred 350 to the larger bin at the new address. A full bin is easily identified since the hash table indices contain the current capacity of each bin and the current number of records in each bin as well as the bin address—if a comparison 320,330 between the current number of records and the capacity finds that they match, then the bin needs to be expanded 350 before more data can be entered 340. The data entry process thus includes the step of checking 320 this data within a hash table index.

Figure 4:
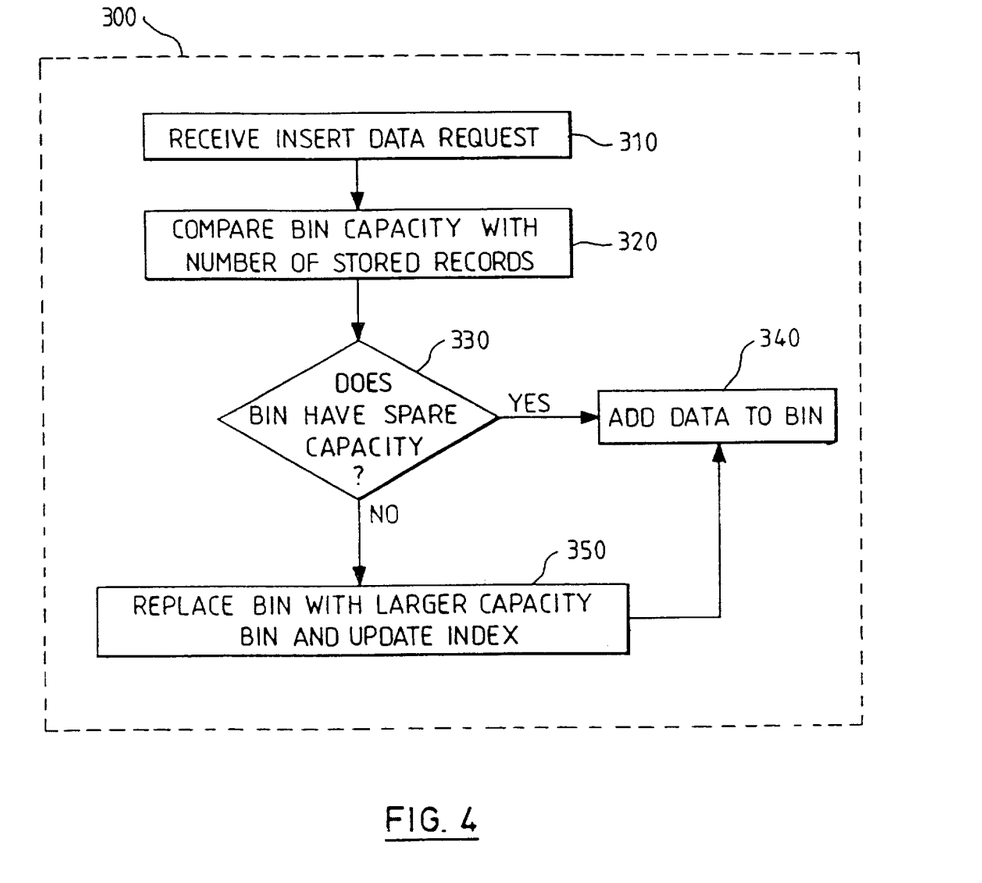
FIGS. 4 and 5 are schematic flow diagrams showing the steps of particular aspects of a method of reorganising a database according to an embodiment of the invention.

The storage space which is freed-up by moving the bin is subsequently reallocated when required. Extending the data files by this mechanism can be repeated as required until the data file reaches its preset maximum size. In the preferred embodiment, the data files have a set maximum storage capacity of 500 MB.

Figure 5:
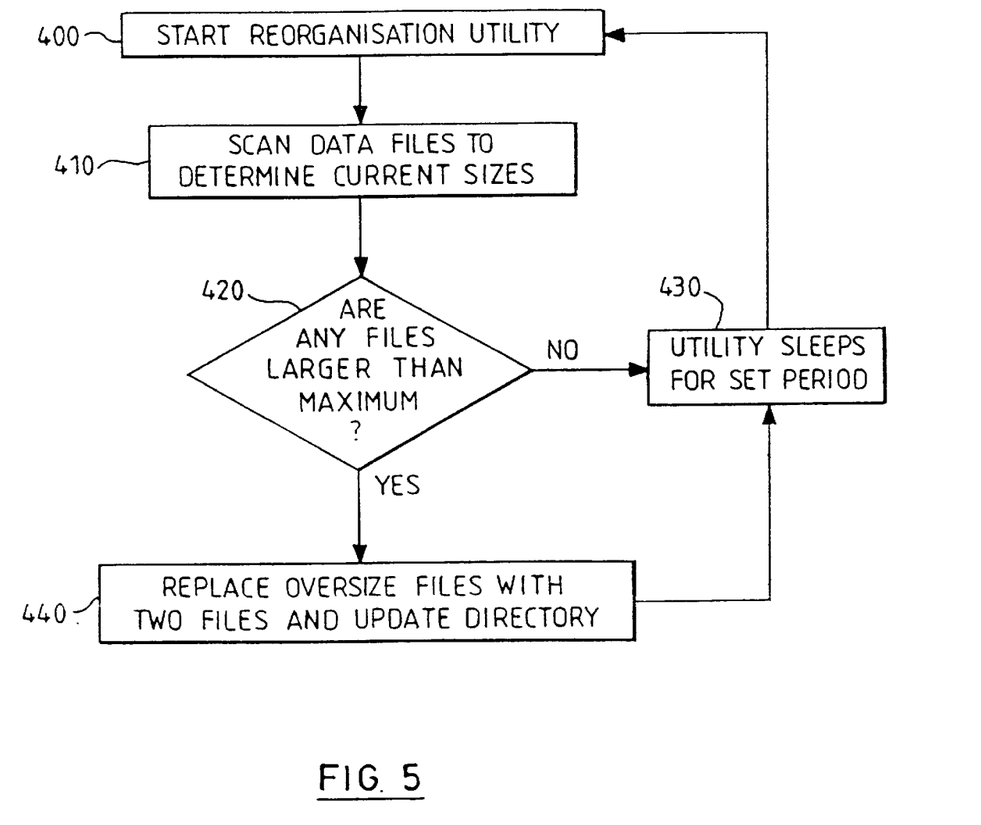

When a file such as dbfile.00 has reached its maximum size, any further insertion of data requires splitting of the indexed data file, as will now be described with reference to FIG. 5. This is handled by a utility within the controller software 50 which is set up by a system administrator to run periodically 400 as a background data reorganisation process while the database is off-line (i.e. unavailable for data access). The complete database is scanned 410 by this process to check all data file sizes. The period between scans may be set by the system administrator to be one day or one week, for example, and the scan may be set to run daily at midnight (when no data access operations are being performed), or at whatever time and frequency is considered appropriate for the desired size of the data files and the administrator's expectations as to how quickly the database is likely to expand. The administrator may trigger this reorganisation process manually if desired, but an automated time-based trigger for the scanning of file sizes is preferred.

When file dbfile.00 is found by this utility to have expanded beyond the defined maximum (at step 420), it is split into a number of files. According to the preferred embodiment, one file is replaced 440 with two files (which minimizes the increase in allocated storage space).

For example, if dbfile.00 has grown beyond the normal operating range, it may be split into dbfile.001 and dbfile.000, both of which are smaller than the normal operating size limit.

This requires a corresponding change 440 to the radix tree directory, and this is also handled by the background reorganisation utility of the controller software 50. when the system restarts the radix tree directory will then indicate this different key splitting. There will now need to be two file indices built and held in memory where previously there had only been one, so this places a small extra demand on the system, but since the amount of data is growing, this is to be expected. Access to the data in the two new files will be slightly quicker, since the bins within both files will have become smaller, and less collision detection or "disambiguation" will be needed.

As another example, oversize files may be replaced by four files each having the same storage capacity of 500 MB and called:

dbfile.0000
dbfile.0001
dbfile.0010 and
dbfile.0011

In this example, the leaf node of the directory containing the pointer to dbfile.00 is replaced (under the control of the background reorganisation utility of the controller software) by a branching node at which the third and fourth bits of the N bit numbers beginning '00' are analysed by a comparator to identify one of four leaf nodes each containing a pointer to one of the new files dbfile.0000, dbfile.0001, dbfile.0010 and dbfile.0011. Note that there is no requirement at this stage for the files dbfile.01, dbfile.10 or dbfile.11 to be replaced and there is no requirement for the directory to have a uniform number of hierarchical levels for all branches. There is also no requirement for all directory pointers to point to their own separate disk file.

The replacement of disk files and modification of the directory representing the allocation of data to files is thus implemented as a local modification which only adds to the depth of the directory at the required position. This significantly reduces wastage of storage space compared with methods which require a uniform directory structure with the same number of levels for each branch. with databases holding abstract data such as a biometric data, there is typically a very uneven distribution of data across the key space and so local extensibility can save a great deal of storage space when compared with extending the database and keeping a uniform directory depth. Local modification similarly makes shrinking of the directory in response to a reduction of the data in the database much simpler than if entire layers of a uniform directory must be removed for shrinking to occur, as the amount of rehashing is greatly reduced.

After a period of time in which data has been added to the database, certain of the four data files in our example will have been split, and under-used data files may have been joined. The database may now include, for example, the following files:

dbfile.0000
dbfile.0001
dbfile.0010
dbfile.0011
dbfile.0100
dbfile.010100
dbfile.010101
dbfile.010110
dbfile.010111
dbfile.0110
dbfile.0111
dbfile.10
dbfile.11

The numerals within each file name suffix are representative of the initial bit pattern of the N bit numbers allocated to the file, and represent the sequence of bits of a key used to identify a file. This enables the file names themselves to represent the directory structure. It also allows the depth of the directory to be determined directly from the file names.

Figure 2A:
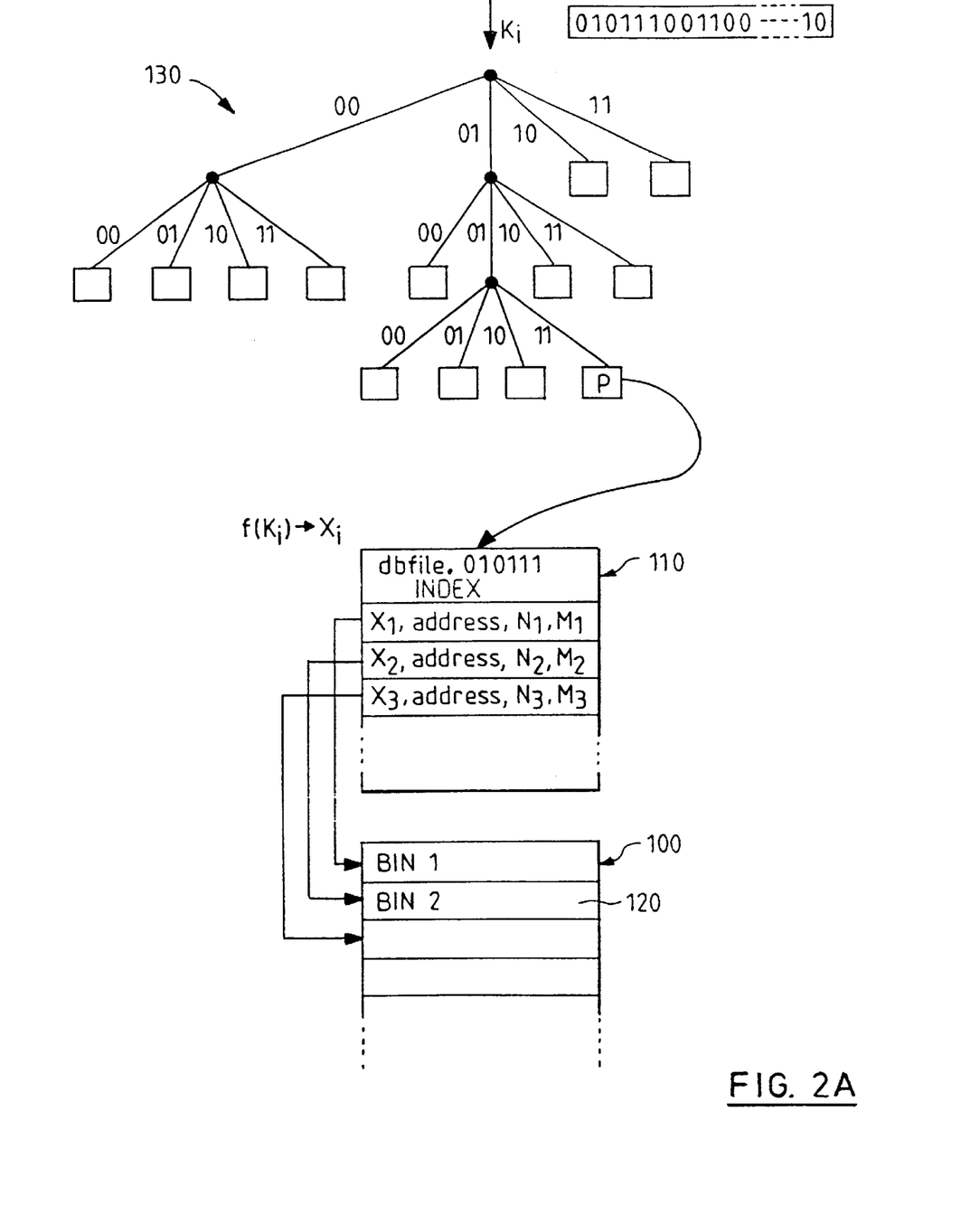
FIG. 2 is a representation of an example data organisation map according to an embodiment of the invention, showing both conceptual (FIG. 2A) and physical (FIG. 2B) representations of the directory and an example hash table.
Figure 2B:
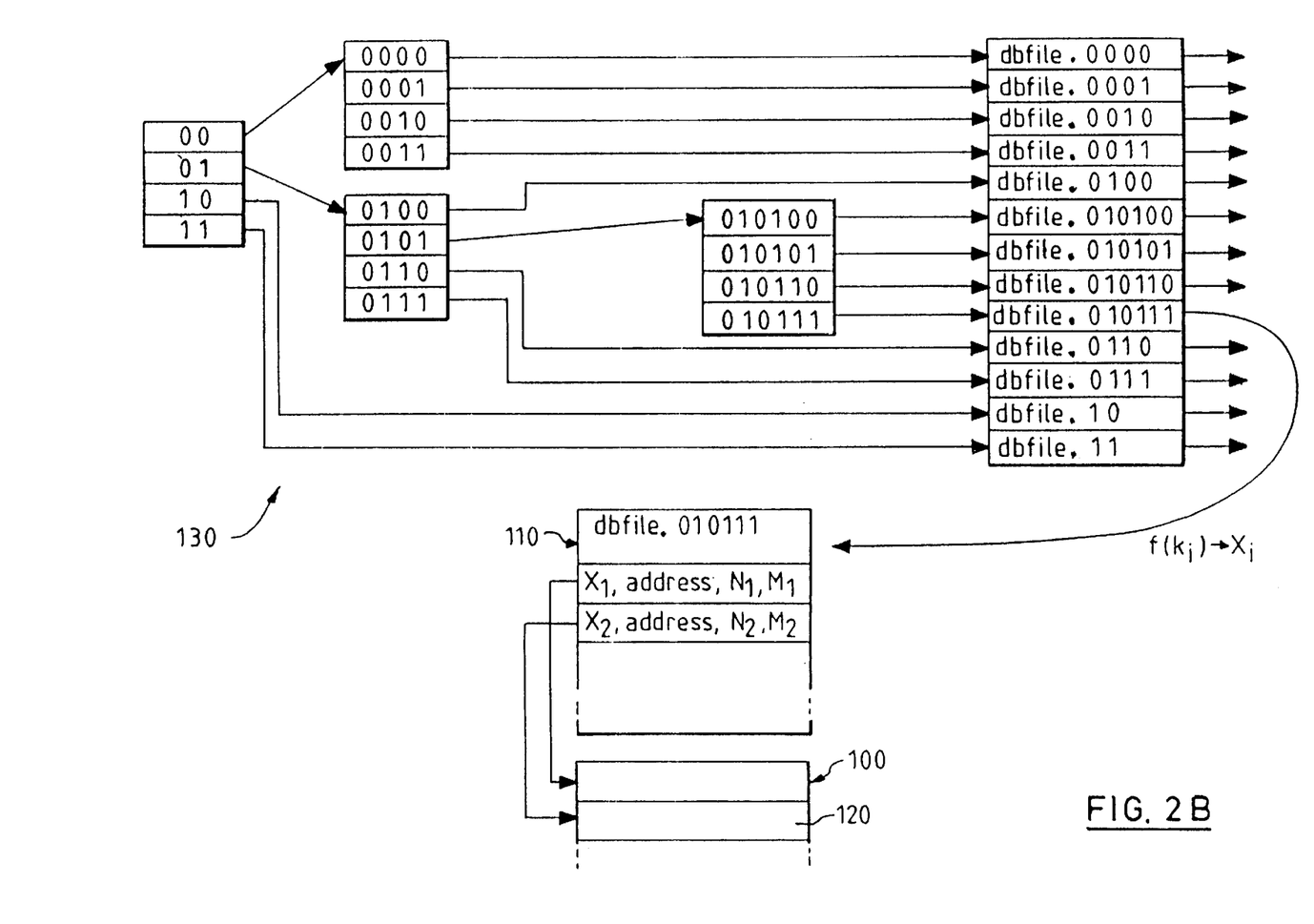

FIG. 2 shows a data organisation map representing this file structure. In this example database, there is little data for keys beginning '10' and '11', so they may require only one file for their data. There is more data for keys beginning '01', perhaps requiring a file just for keys beginning '010111'. Note that the splitting of files into separate files according to their amount of data causes changes to the radix tree directory and that the directory always forms a complete binary tree.

Addition of data can thus lead to more files being required to hold the data for certain areas of the key space and, as files are split to create new files, the range of N bit numbers and associated data each new file contains will be narrower. If an area of the key space does not have much associated data then the data can be held in fewer files and fewer levels of the hierarchical directory are required for that area of the key space. The organisation of hash tables and the directory pointing to the hash tables is optimised for the current state of the database. This entails providing the rapid searching of hashing to access data where an area of the key space is relatively sparsely populated with data, but replacing hash tables with indexed data files which avoid the collision detection of conventional hashing techniques by using the directory to point directly to the data associated with an access key where that key has a lot of data associated with it (since the bin contains only data for that key). This will now be described in more detail.

As the amount of data associated with certain keys increases, there will be a relatively small number of keys mapped to an individual disk file. When this number is less than a predefined threshold which represents the maximum number of entries deemed appropriate for a disk file index (for example, 16384 entries—see below), hashing is no longer necessary and it is desirable to reorganize the disk file such that each bin holds data for only a single key. The disk file index for identifying data bins will then provide a direct access to the data relating to an input key, and no collision detection will be required. This saving of the cost of collision detection as the system grows is a significant advantage of the present invention.

In the preferred embodiment, this reorganisation is part of the background data reorganisation process implemented by the off-line utility of the controller software 50. When a disk file has been identified as larger than the preset maximum size (e.g. 500 MB) and so is to be split, the reorganisation process identifies how many bits of the N bit number are to be used by the directory to identify the relevant disk file and how many bits are available for use in the disk file to distinguish between keys. If an input key is a 30 bit number and 16 bits are used by the directory, then 14 bits remain for use to distinguish between keys in the disk file and so the number of different keys which map to that disk file is $2^{14}$ (16384).

Thus, when the directory depth is determined by the reorganisation utility to be 16 levels deep at some point (as demonstrated by certain disk file names including 16 bit suffixes representing the data they hold), the new disk files which are created to replace the over-sized disk file will not be hash tables requiring collision detection to separate relevant from irrelevant data within a bin, but will have indices mapping each input key to its own separate data bin.

If sufficient data records are deleted from certain disk files, the data may be reallocated to a smaller number of disk files, with consequential shrinking of the directory. The disk files are preferably all maintained at the same order of magnitude in size, preferably between 100–500 MB.

If the system administrator wants to rebalance the data over a larger or smaller number of nodes or disks, they can thus do so while the system is off-line and the system will rebuild the map of files and the radix tree directory with appropriate modifications when it restarts.

Having described allocation of data to storage locations, the accessing of stored data within the file system will now be described in detail. When a person's fingerprint is scanned, the file system 10 including the database of fingerprint characteristics can now be used to verify that person's identity. The data organisation described earlier enables efficient access to the database of fingerprint-characterising data records.

As noted earlier, each data entry operation is preferably coupled with a table lookup operation to determine whether data is already held in the file system for that individual. For certain databases, it will be essential for data which is characteristic of an individual to be added to the database only after a comparison has been performed with data already stored in the database, to avoid duplicate records appearing for the same person. An example of this is a social services database where it is important to prevent individuals collecting welfare payments under multiple aliases, or an identity card database where no individual should have multiple identities. Thus, there is often a dual requirement for the ability to verify the identity of an individual by checking their records in the database and the ability to determine whether this individual already has an entry in the database before new data is added. In some embodiments of the invention, the comparison steps which will now be described are therefore part of the process of adding data items to the database.

A scanner 20 scans a fingerprint and captures a fingerprint image which is then processed by a connected computer 30 to identify minutiae. The minutiae are processed to generate a large number of N bit numbers (for example, 5000) which characterise the image by reference to local groups of minutiae. This generation of data comprises the same sequence of steps described above in relation to adding new entries to the database. However, the required operation now is to compare the generated data characterising the current scanned image with stored fingerprint-characterising data for the population of people whose fingerprints are stored. This may be a verification or identification operation subsequent to entering a person's data into the database, or it may be a check prior to adding data to the database.

Each of the 5000 generated N bit numbers is a key which is used to identify a relevant data storage bin within an identified indexed data file, as described above for a data entry operation. Having identified the storage bin for one of the keys, all data records within that bin are copied into system memory. The controller software then determines which of the copied records relates to the key. This is achieved by simple comparison between the hashed key and the record data (since the hashed key is part of the stored data for each record). The determination of which data records in a bin are relevant to a given key is necessary for any bin holding data for a plurality of different keys. Bins usually contain data for more than one key. The identification of a bin and "disambiguation" or selection of relevant records is performed for each N bit number independently of the other N bit numbers generated from the same fingerprint image.

Each data entry operation corresponding to registration of an individual and also each verification and search operation for an individual preferably includes the above described steps for data allocation or data access. The insertion and deletion of data items are handled in the same way as comparisons, except that the bin is altered and then written back for insertions and deletions.

For concurrent processing of such a large number of N bit numbers, the implementation in a parallel processing system is advantageous. The directory is used to identify, by means of a pointer within a leaf node, the node of the system on which records having the same initial key bit pattern as the current data item are stored. That determination provides a clear identification of the relevant node of the parallel system. The bit pattern of the current data item is iteratively analysed to select a path through the directory until a leaf node is reached, and then the pointer within the leaf node points to one of the nodes and one of the disk files.

Having transformed an input key and compared the transformed key with the index of an identified hash table to identify a bin, operating system facilities are used to read data records in the bin and the data records within the bin are analysed to obtain just the data for the current key. In the present embodiment, this simply involves comparing the key with each data record in the bin. Each key search then outputs a number of data records comprising the records associated with the key. Keys are not unique to an individual person and so each data record output as a result of the search will typically identify a different person. Each of these identifications may be thought of as a "vote" or suggestion as to which person registered with the system the scanned fingerprint belongs to. These identifications of individuals resulting from each of the 5000 key search operations are then compared and individuals who only have one or two "votes" for them are discounted. If one individual has hundreds of positive votes, or even 25 or 50 positive votes then there is a high likelihood that this is a fingerprint match since there are many common characteristics between the scanned and stored fingerprints. The controller software 50 according to the preferred embodiment is thus able to analyse the 5000 search outputs and make a determine as to whether there is a reliable match identifying a particular person.

These steps implemented for retrieving the stored data for a key may be summarised as follows:

1. If the system is running on a parallel processor use the radix tree directory to decide which node the data for the key is on.
2. Use the radix tree directory to decide which of a number of indexed data files on that node contains the data for the key.
3. Use the index for the indexed data file to locate the bin that contains the data for the key. The indices for the files are read at start-up time and held in memory, although they may be paged out if there is not room to hold them all.
4. Use the operating system to read in the bin and retrieve the contents of the bin into memory.
5. "Disambiguate" the data within the bin—i.e. select just the data records for the given key from the records within the bin.

Then the retrieved data for a large number of different keys generated from one fingerprint is compared to determine whether a particular individual is identified a large number of times. A person skilled in fingerprint analysis may then check whether a match identified by the controller software 50 is valid. The advantages of automated scanning of several million fingerprints and identification of probable matches are clear even if such manual checking of the end result is considered desirable.

In an alternative embodiment of the invention, a representative sample of the data to be stored is used to estimate the distribution of keys and this information is combined with the expected final size of the database to determine an appropriate database organisation for the expected database size and distribution. The database is then separated into the appropriate number of disk files, and the directory is built to enable each disk file to be accessed via a pointer held at a corresponding leaf node of the directory. It is also possible to allocate space to each of the bins according to their predicted size. This requires a considerable amount of disk space to be available at the beginning as well as accurate data distribution information, as an alternative to the database map and associated resources being minimized and only expanded when required.

What is claimed is:

1. A data access mechanism for a computer filing system, the access mechanism including:
    an extensible hierarchical directory having a plurality of directory entries at least some of which provide pointers to respective indexed data files;
    logic for analysing a data key input to said filing system, by comparison of the data key with entries in the extensible hierarchical directory, to identify one of said plurality of directory entries providing a pointer to a respective indexed data file of the respective indexed data files;
    a plurality of indexed data files for storing data; and
    a plurality of indices, each corresponding to one of said indexed data files;
    wherein each of said indexed data files is locatable via one of said pointers, wherein the index for each of said indexed data files contains identifiers and storage addresses of data blocks therein, each of said indexed data files having associated logic for transforming an input data key to generate a transformed key and logic for comparing a transformed key with data block identifiers in the index to identify a match and to obtain the address of an identified data block within the indexed data file, and each of said indexed data files having associated logic for identifying from records within the identified data block one or more data records related to the input data key.

2. A data access mechanism according to claim 1, wherein:
    the directory is an hierarchical directory comprising a plurality of branch nodes pointing to other nodes to define paths through the directory from a root node to a plurality of leaf nodes each forming the lowest level of the hierarchy for a respective path, each leaf node providing a pointer to an indexed data file; and
    the logic for analysing an input data key by comparison with the directory is adapted to iteratively analyse the input data key by comparison of the key with directory entries at each successive node of a path through the directory to select a branch to a next node leading to a respective leaf node, each iteration of the analysis at each successive node using one or more additional bits of information from the input key to distinguish between keys and select a branch.

3. A data access mechanism according to claim 1, wherein:
    the indexed data files each have a predefined maximum size and are extensible up to said predefined maximum; and
    the data access mechanism includes logic for identifying indexed data files exceeding the predefined maximum size and for responding to a first indexed data file exceeding the predefined maximum size by replacing the first indexed data file with two or more separate indexed data files and by extending the hierarchical directory by addition of new directory nodes branching from the node of the directory which previously identified the pointer to the first indexed data file, the new nodes forming a new lowest level of the directory hierarchy for the respective branch, such that the extended directory is adapted to use one or more additional bits of information from input data keys to distinguish between the keys and select a branch to identify a respective pointer to one of said two or more replacement indexed data files.

4. A data access mechanism according to claim 3, wherein said logic for replacing the first indexed data file is adapted to determine when an array of keys mapped to a replacement indexed data file includes no more than a threshold number of keys and, in response to said determination, to build the index for said replacement indexed data file such that each key within said array of keys corresponds to a separate data block within said file.

5. An indexed file system including a data processing system having a processor, memory, peripheral storage, and communication buses for transferring data between said processor, memory and peripheral storage, said indexed file system also including a data allocation and access mechanism comprising:
    an extensible hierarchical directory including a plurality of directory entries at least some of which provide pointers to respective indexed data files;

logic for use by said processor to analyse a data key input to said filing system, by comparison of the data key with entries in the extensible hierarchical directory, to identify one of said plurality of directory entries providing a pointer to a respective indexed data file of the respective indexed data files;

a plurality of indexed data files for storing data in said peripheral storage; and a plurality of indices, each corresponding to one of said indexed data files;

wherein each of said indexed data files is locatable via one of said pointers, wherein the index for each of said indexed data file, contains identifiers and storage addresses of data blocks within the indexed data file, each of said indexed data files having associated logic for use by said processor to transform an input data key to generate a transformed key and logic for use by said processor to compare the transformed key with data block identifiers in the index to identify a match and to obtain the address of an identified data block within the indexed data file, and each of said indexed data files having associated logic for use by said processor to identify from records within the identified data block one or more data records related to the input data key.

6. A filing system for a computer including:

a directory having a plurality of directory entries at least some of which contain pointers to respective indexed data files;

logic for analysing a data key input to said filing system, by comparison of the data key with entries in the directory, to identify one of the plurality of directory entries providing a pointer to a respective indexed data file for storing data relating to the input key;

a plurality of indexed data files for storing data, each locatable via one of said pointers; and a plurality of indices, each corresponding to one of said indexed data files;

wherein the index for each indexed data file contains identifiers and storage addresses of data blocks within the indexed data file and has associated logic for comparing an input data key with data block identifiers in the index to identify a match and to obtain the address of an identified data block within the indexed data file; and wherein the filing system includes logic for:

(a) identifying indexed data files which exceed a preset maximum file size; and (b) replacing said excessive-sized indexed data files with a plurality of indexed data files, including updating the directory to include separate directory entries each containing a pointer to one of said replacement indexed data files.

7. A filing system according to claim 6, wherein said logic for replacing said excessive-sized indexed data files is adapted to determine when an array of keys mapped to a replacement indexed data file includes no more than a threshold number of keys and, in response to said determination, to build the index for said replacement indexed data file such that each key within said array of keys corresponds to a separate data block within said file.

8. A method of accessing data records in a computer file system using an access mechanism the method comprising the steps of:

providing an extensible hierarchical directory having a plurality of directory entries at least some of which provide pointers to respective indexed data files;

limiting the respective indexed data files to a predefined maximum size which are extensible up to said predefined maximum;

analysing a data key input to said file system by comparing the data key with entries in the extensible hierarchical directory in order to identify one of said plurality of directory entries which provide a pointer to a respective indexed data file;

storing data in a plurality of indexed data files;

providing a plurality of indices each corresponding to one of said indexed data files;

locating each of said indexed data files via one of said pointers, the index for each of said indexed data files contains identifiers and storage addresses of data blocks within the indexed data file;

transforming the input data key to generate a transformed key;

comparing the transformed key with data block identifiers in the index to identify a match and to obtain the address of an identified data block within each of said indexed data files;

identifying from records within an identified data block one or more data records related to the input data key;

analysing an input data key, in response to receipt of the input data key, by comparison with entries in the directory to identify a directory entry providing a pointer to a respective indexed data file of the indexed data files;

accessing the index for said respective indexed data file;

transforming the input data key to generate the transformed key which is compared with data block identifiers in the index of the indexed data file;

comparing the transformed key with data block identifiers in said index to identify a match;

obtaining from said index the address of the identified data block;

identifying from records within the identified data block one or more records related to the input data key.

9. A method of reorganising a database including reorganising an access mechanism comprising the steps of:

providing an extensible hierarchical directory comprising a plurality of branch nodes pointing to other nodes to define paths throuth the directory from a root node to a plurality of leaf nodes each forming the lowest level of the hierarchy for a respective path, each leaf node providing a pointer to an indexed data file;

analysing a data key input to said file system by comparing the data key with entries in the extensible hierarchical directory in order to identify one of said plurality of directory entries which provide a pointer to a respective indexed data file;

storing data in a plurality of indexed data files;

providing a plurality of indices each corresponding to one of said indexed data files;

locating each of said indexed data files via one of said pointers, the index for each of said indexed data files contains identifiers and storage addresses of data blocks within the indexed data file;

transforming the input data key to generate a transformed key;

comparing the transformed key with data block identifiers in the index to identify a match and to obtain the address of an identified data block within each of said indexed data files;

identifying from records within an identified data block one or more data records related to the input data key; and analysing an input data key by comparison with the extensible hierarchical directory by adapting to iteratively analyse the input data key by comparison of the key with directory entries at each successive node of a path through the directory to select a branch to a next node leading to a respective leaf node, each iteration of the analysis at each successive node using one or more additional bits of information from the input key to distinguish between keys and select a branch;

periodically scanning said indexed data files to determine the size of each indexed data file;

comparing the size of each indexed data file with a preset file size limit to identify indexed data files larger than said preset size limit; and for indexed data files larger than said preset size limit, replacing the indexed data file with two or more separate indexed data files and extending the hierarchical directory by addition of new directory nodes branching from the node of the directory which previously identified the pointer to the first indexed data file, the new nodes forming a new lowest level of the directory hierarchy for the respective branch, the extended directory then using one or more additional bits of information from input data keys to distinguish between the keys and select a branch to identify a respective pointer to one of said two or more replacement indexed data files.

10. A method according to claim 9, wherein said step of replacing an indexed data file which is larger than the preset size limit includes the steps of:

determining when an array of keys mapped to a replacement indexed data file includes no more than a threshold number of keys and, in response to said determination, building the index for said replacement indexed data file such that each key within said array of keys corresponds to a separate data block within said file.

11. A computer program product comprising computer program code recorded on a machine readable recording medium, the program code including instructions for implementing the steps of:

providing an extensible hierarchical directory having a plurality of directory entries at least some of which provide pointers to respective indexed data files;

limiting the respective indexed data files to a predefined maximum size which are extensible up to said predefined maximum;

analysing a data key input to said file system by comparing the data key with entries in the directory in order to identify one of said plurality of directory entries which provide a pointer to a respective indexed data file;

storing data in a plurality of indexed data files of the indexed data files;

providing a plurality of indices each corresponding to one of said indexed data files;

locating each of said indexed data files via one of said pointers, the index for each indexed data file contains identifiers and storage addresses of data blocks within the indexed data file;

transforming the input data key to generate a transformed key and logic for comparing a transformed key with data block identifiers in the index to identify a match and to obtain the address of an identified data block within the indexed data file;

identifying from records within an identified data block one or more data records related to the input data key;

analysing an input data key, in response to receipt of the input data key, by comparison with entries in the directory to identify a directory entry providing a pointer to a respective indexed data file of the indexed data files;

accessing the index for said respective indexed data file;

transforming the input data key to generate a transformed key which is compared with data block identifiers in the index of the indexed data file;

comparing the transformed key with data block identifiers in said index to identify a match;

obtaining from said index the address of the identified data block;

identifying from records within the identified data block one or more records related to the input data key.

12. The computer program of claim 11, including the further steps of:

identifying indexed data files exceeding the predefined maximum size;

responding to a first indexed data file exceeding the predefined maximum size by replacing the first indexed data file with two or more separate indexed data files and by extending the hierarchical directory by addition of new directory nodes branching from the node of the directory which previously identified the pointer to the first indexed data file; and forming a new lowest level of the directory hierarchy nodes for the respective branch with the new, such that the extended directory is adapted to use one or more additional bits of information from input data keys to distinguish between the keys and select a branch to identify a respective pointer to one of said two or more replacement indexed data files.

* * * * *